(12) United States Patent
Wohlfarth et al.

(10) Patent No.: US 12,552,197 B2
(45) Date of Patent: Feb. 17, 2026

(54) WHEEL SYSTEM WITH AN ADAPTER DISC

(71) Applicant: Klaus Wohlfarth, Fichtenberg (DE)

(72) Inventors: Klaus Wohlfarth, Fichtenberg (DE); Edgar Simonjan, Vellberg (DE)

(73) Assignee: Klaus Wohlfarth, Fichtenberg (DE)

( * ) Notice: Subject to any disclaimer, the term of this patent is extended or adjusted under 35 U.S.C. 154(b) by 776 days.

(21) Appl. No.: 17/879,420

(22) Filed: Aug. 2, 2022

(65) Prior Publication Data

US 2023/0050606 A1 Feb. 16, 2023

(30) Foreign Application Priority Data

Aug. 11, 2021 (DE) .......................... 102021208800.7

(51) Int. Cl.
*B60B 3/14* (2006.01)
*B60B 3/16* (2006.01)

(52) U.S. Cl.
CPC .............. *B60B 3/147* (2013.01); *B60B 3/16* (2013.01)

(58) Field of Classification Search
CPC .............. B60B 3/147; B60B 3/16; B60B 3/18
See application file for complete search history.

(56) References Cited

U.S. PATENT DOCUMENTS

| | | | | |
|---|---|---|---|---|
| 5,362,134 A | * | 11/1994 | Carmona | B60B 3/008 301/9.1 |
| 5,601,343 A | * | 2/1997 | Hoffken | B60B 1/06 301/111.04 |
| 5,636,905 A | * | 6/1997 | Pagacz | B60B 3/165 301/35.63 |
| 5,887,952 A | * | 3/1999 | Gandellini | B60B 3/02 301/35.63 |
| 9,463,665 B2 | * | 10/2016 | Kleber | B60B 3/16 |
| 10,112,436 B2 | * | 10/2018 | Denmead | B60B 3/16 |
| 10,759,218 B2 | * | 9/2020 | Wohlfarth | B60B 3/147 |
| 2007/0158998 A1 | | 7/2007 | Aron | |
| 2016/0046146 A1 | | 2/2016 | Wohlfarth et al. | |
| 2021/0237507 A1 | * | 8/2021 | Schuster | B60B 3/16 |
| 2022/0080770 A1 | | 3/2022 | Simonjan | |

FOREIGN PATENT DOCUMENTS

| | | |
|---|---|---|
| CN | 107000473 A | 8/2017 |
| DE | 4312438 C1 | 10/1994 |
| DE | 19652687 C2 | 6/1998 |
| EP | 0641677 B1 | 3/1995 |

(Continued)

OTHER PUBLICATIONS

Taiwan Office Action with English translation issued in corresponding Taiwan Application No. 11320019390 dated Jan. 4, 2024 (12 pages).

(Continued)

*Primary Examiner* — Jason R Bellinger
(74) *Attorney, Agent, or Firm* — FLYNN THIEL, P.C.

(57) ABSTRACT

A rim system including a rim, an adapter disc for mounting on a wheel hub of a vehicle, a plurality of wheel screws or a plurality of wheel nuts for fastening the rim to the adapter disc, a plurality of screws or a plurality of nuts for fastening the adapter disc to the wheel hub and a wheel hub centring ring for centring the adapter disc relative to the wheel hub. A rim centring ring is provided for centering the rim relative to the adapter disc.

20 Claims, 11 Drawing Sheets

(56) References Cited

FOREIGN PATENT DOCUMENTS

| | | |
|---|---|---|
| EP | 0703100 A2 | 3/1996 |
| JP | 338201 U | 4/1991 |
| JP | 2005138728 A | 6/2005 |
| JP | 2017527486 A | 9/2017 |
| WO | 9404379 A1 | 3/1994 |
| WO | 2020160992 A1 | 8/2020 |

OTHER PUBLICATIONS

German Office Action issued in corresponding German Application No. 10 2021 208 800.7, issued Feb. 21, 2024 (4 pages).
Notice of Reasons for Rejection with English translation issued in corresponding Japanese Application No. 2022-122523 dated Oct. 17, 2023 (5 pages).
Australian Office Action issued in corresponding Australia Application No. 2022215170 dated Nov. 2, 2023 (5 pages).
European Search Report issued in corresponding European Application No. 22186886.2 with English translation of categories of cited documents, dated Jan. 17, 2023 (6 pages).

* cited by examiner

WHEEL SYSTEM WITH AN ADAPTER DISC

CROSS REFERENCE TO RELATED APPLICATION

This claims priority from German Application No. 10 2021 208 800.7, filed Aug. 11, 2021, the disclosure of which is hereby incorporated by reference in its entirety.

TECHNICAL FIELD

The invention relates to a wheel system comprising a wheel, comprising an adapter disc for mounting on a wheel hub of a vehicle, comprising a plurality of wheel screws or a plurality of wheel nuts for fastening the wheel to the adapter disc, comprising a plurality of screws or a plurality of nuts for fastening the adapter disc to the wheel hub and comprising a wheel hub centering ring for centering the adapter disc relative to the wheel hub. The invention also relates to an arrangement comprising a wheel system according to the invention and a wheel hub of a vehicle.

BACKGROUND AND SUMMARY

A wheel system comprising a wheel, comprising an adapter disc for mounting on a wheel hub of a vehicle, comprising a plurality of wheel screws for fastening the wheel to the adapter disc, comprising a plurality of screws for fastening the adapter disc to the wheel hub and comprising a wheel hub centering ring for centering the adapter disc relative to the wheel hub, is disclosed in European patent publication EP 0 641 677 B1 (see FIG. 41).

A wheel system and an arrangement comprising a wheel system are intended to be improved by means of the invention.

In a wheel system comprising a wheel, comprising an adapter disc for mounting on a wheel hub of a vehicle, comprising a plurality of wheel screws or a plurality of wheel nuts for fastening the wheel to the adapter disc, comprising a plurality of screws or a plurality of nuts for fastening the adapter disc to the wheel hub and comprising a wheel hub centering ring for centering the adapter disc relative to the wheel hub, it is provided that a wheel centering ring is provided for centering the wheel relative to the adapter disc.

The wheel centering ring forms a separate component and is not designed in one piece with the adapter disc. The provision of a wheel centering ring permits an accurate centering of the wheel relative to the adapter disc and thus indirectly relative to the wheel hub. By means of the wheel centering ring there is the possibility of compensating for tolerances of the wheel. Moreover, the provision of a wheel centering ring makes it possible to design the adapter disc as a single, substantially planar disc. As a result, the production costs for the wheel system according to one aspect of the invention may be markedly reduced. The wheel system is also flexible, such that different wheels may be centered by means of different wheel centering rings. One and the same adapter disc may thus be used with different wheels. The wheel hub centering ring may be provided for arranging between the adapter disc and the wheel hub. The wheel hub centering ring has, for example, a centering portion which is arranged in the radial direction between the adapter disc and an outer circumference of the wheel hub. The wheel centering ring is provided for arranging between the wheel and the adapter disc. The wheel centering ring may have, for example, a portion protruding from the wheel, wherein this protruding portion is then centered in a central bore of the adapter disc. The wheel centering ring may be fastened to the wheel or to the adapter disc. The wheel centering ring and the wheel hub centering ring may be combined in a single one-piece component, wherein this component is configured separately from the adapter disc.

In a development of the invention the wheel centering ring consists of plastics.

This makes it possible to produce the wheel centering ring cost-effectively in large quantities. For example, the wheel centering ring may be designed as a plastics injection-moulded part, in particular consisting of fibre-reinforced plastics. The wheel centering ring fulfils its essential mechanical function simply when mounting the wheel, by permitting an accurate centering of the wheel relative to the adapter disc. During the operation of the vehicle, the wheel centering ring is not subjected to load or does not have to fulfil any mechanical retaining function. A design of the wheel centering ring from plastics makes it possible, for example, to produce the wheel centering ring with a slight overdimension, such that the wheel centering ring is centered on the adapter disc without clearance and at the same time slightly deformed, if necessary.

In a development of the invention, a centering surface of the wheel centering ring has plurality of nubs or projections.

Such nubs or projections protrude from the centering surface and may be flattened or deformed in some portions during the centering. As a result, it is possible to compensate for tolerances. The nubs or projections form portions of the centering surface having an over-dimension. When attaching the wheel with the wheel centering ring onto the adapter disc, these projections are generally deformed to different degrees and may thereby compensate for tolerances in the dimensions of the adapter disc. In the same manner, therefore, the wheel centering ring may also compensate for tolerances of the wheel. The nubs or projections protrude, for example, by 0.15 mm to 0.2 mm beyond the centering surface. The nubs or projections may have, for example, a diameter or a width of 0.3 mm to 0.4 mm. The projections may have, for example, a length of 0.5 mm to 1.5 mm. The projections may extend merely over a part of the length of the centering surface.

In a development of the invention, a centering surface of the wheel centering ring is configured to be slightly conical.

The centering surface of the wheel centering ring may taper in the direction away from the wheel when the wheel centering ring is arranged on the wheel. As a result, the wheel centering ring may be attached in a simple manner onto the central opening of the adapter disc and, by the insertion of the centering surface into the central opening of the adapter disc, the wheel centering ring is automatically centered together with the wheel relative to the adapter disc. A conicity of the centering surface is, for example, only a few tenths of a millimeter, for example $\frac{1}{10}$ mm to $\frac{3}{10}$ mm.

In a development of the invention, the wheel centering ring is fastened by latching means to the wheel.

In this manner, the wheel centering ring may be fastened securely and without clearance in a central bore of the wheel.

In a development of the invention, the wheel centering ring has at least two latching lugs and the wheel has a circumferential groove in a central opening, wherein the at least two latching lugs are provided for latching into the circumferential groove.

The latching connection between the latching lugs and the groove is latched by simply inserting the wheel centering ring into the central opening of the wheel. The latching connection may be opened again by strong pressure, for example, without the use of tools.

In a development of the invention, a centering surface of the wheel centering ring is configured to cooperate with an inner circumference of a central opening of the adapter disc.

In this manner, only a small amount of space is required for the arrangement of the centering surface in the mounted state of the wheel system. Since the centering surface acts on an inner circumference of a central opening of the adapter disc, more space is available on the adapter disc for the arrangement of the wheel screws and the screws for the connection to the wheel hub.

In a development of the invention, the adapter disc has a plurality of threaded bushes for screwing in the wheel screws, or a plurality of screw bolt inserts for screwing on the wheel nuts.

Since the adapter disc is provided with threaded bushes or screw bolt inserts, the threaded bushes or screw bolt inserts may be produced in large quantities from highly resilient material, i.e. with high mechanical load capacity, for example steel or titanium. The adapter disc, however, may consist of lightweight, less resilient material, for example aluminium.

In a development of the invention, the adapter disc has at least one projection on its surface facing the wheel, wherein the projection is provided for engaging in a suitable recess in the wheel.

Such a projection may facilitate a correctly positioned mounting of the wheel on the adapter disc, such that the wheel screws may be already inserted in the correct position into the wheel or the threaded bushes or threaded bores of the adapter. Such a projection, however, may also be advantageous during the operation of the vehicle in order to prevent the wheel twisting relative to the adapter disc in the case of high torque acting on the wheel.

In a development of the invention, the threaded bushes have a collar which protrudes beyond the surface of the adapter disc facing the wheel, wherein the collar forms the projection for engaging in a suitable recess of the wheel.

A collar of the threaded bushes may facilitate the correctly positioned mounting of the wheel and also serve for absorbing torque, such that a relative twisting between the wheel and adapter disc is reliably prevented in the case of very high torque acting between the adapter disc and the wheel. The recess may be formed by means of a through-opening in the wheel, for inserting a wheel screw.

In a development of the invention, the wheel hub centering ring has a centering surface which is configured to cooperate with an outer circumference of the wheel hub.

In a development of the invention, the centering surface of the wheel hub centering ring has a plurality of nubs or projections.

The nubs or projections on the wheel hub centering ring may be configured in the same manner as on the wheel centering ring.

In a development of the invention, the centering surface of the wheel hub centering ring is slightly conical.

The conicity of the centering surface of the wheel hub centering ring may be of the same size as the conicity of the centering surface of the wheel centering ring.

In a development of the invention, the wheel hub centering ring has latching means for fastening the wheel hub centering ring to the adapter disc.

The latching means may be latched and also released again, for example, without the use of tools.

In a development of the invention, a set comprising a plurality of adapter discs is provided, wherein the adapter discs of the set have different thicknesses and/or different pitch circles for connecting to the wheel hub.

In this manner, for example, different track widths or track widening may be achieved by adapter discs of different thicknesses being used. The adapter discs primarily permit the adaptation to different pitch circles of the wheel hub. As a result, one and the same wheel may be mounted by the interposition of different adapter rings with different pitch circles on vehicles from different manufacturers.

In a development of the invention, a set comprising a plurality of wheel hub centering rings is provided, wherein the wheel hub centering rings of the set have different diameters of the centering surface.

In addition to different pitch circles, different vehicle manufacturers generally also use different diameters of the wheel hubs, in particular external diameters of the wheel hubs, which in mass-produced vehicles are provided for centering the wheel on the wheel hub. This external diameter of the wheel hubs may even vary between vehicles of one and the same manufacturer, as well as the pitch circles. A set comprising a plurality of wheel hub centering rings, wherein the wheel hub centering rings of the set have different diameters of the centering surface, makes it possible to mount one and the same wheel on different vehicles, if required by the interposition of different adapter discs and wheel hub centering rings.

In a development of the invention, a set comprising a plurality of wheel centering rings is provided, wherein the wheel centering rings of the set are configured to center differently configured wheels.

The problem underlying the invention is also solved by an arrangement comprising a wheel system according to the invention and a wheel hub of a vehicle, wherein the adapter disc is fastened to the wheel hub by a plurality of screws or a plurality of nuts, wherein a wheel hub centering ring is provided for centering the adapter disc relative to the wheel hub, wherein the wheel is fastened to the adapter disc by a plurality of wheel screws or a plurality of wheel nuts, and wherein a wheel centering ring is provided for centering the wheel relative to the adapter disc.

Further features and advantages of the invention emerge from the claims and the following description of preferred embodiments of the invention, in connection with the drawings. Individual features of the embodiments shown and described in different ways may be combined together in any manner without departing from the scope of the invention. This also applies to the combination of individual features without the further features with which they are shown in context.

DETAILED DESCRIPTION

Figure 1:
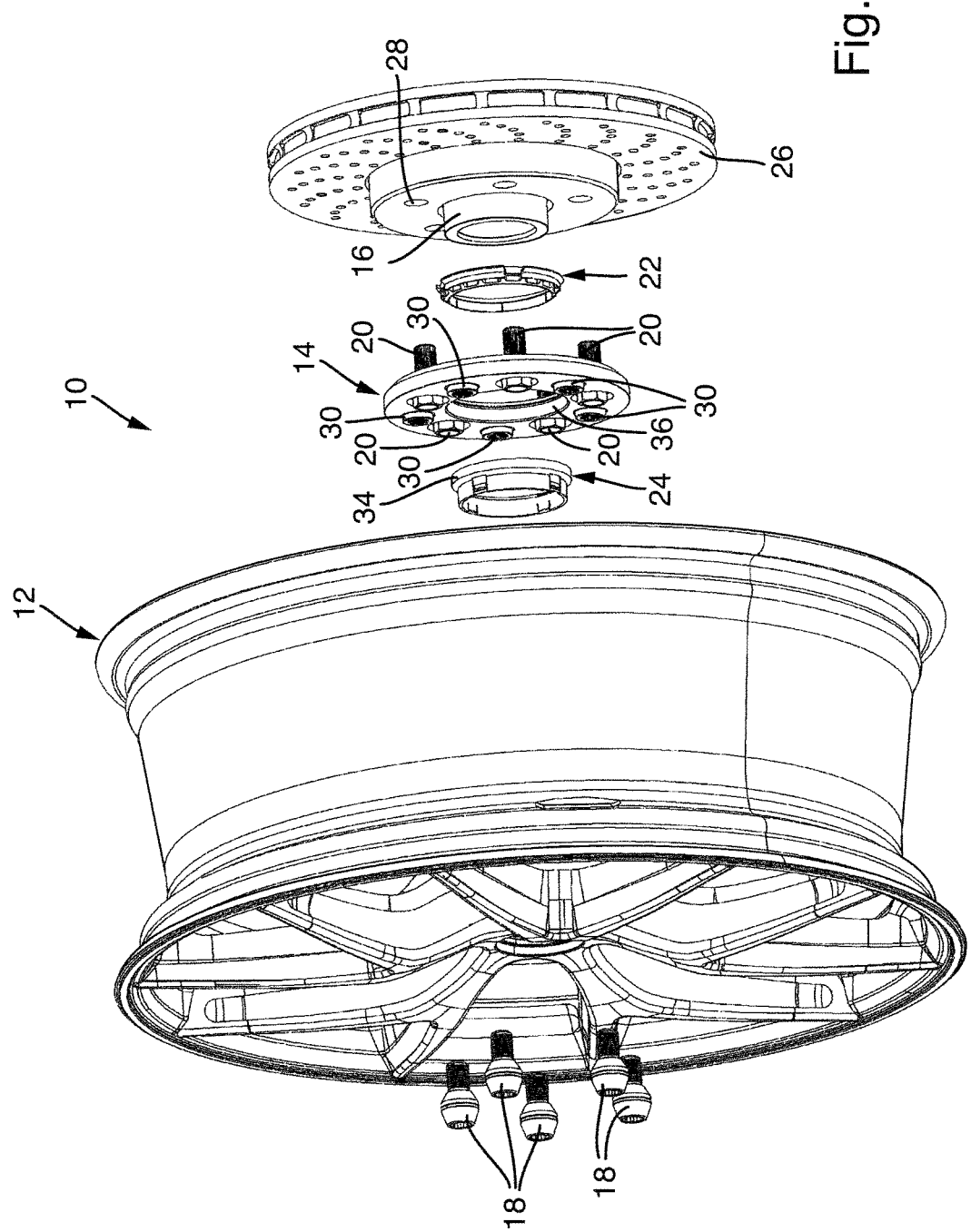
FIG. 1 shows an exploded view of an arrangement according to the invention comprising a wheel system.

FIG. 1 shows an arrangement comprising a wheel system 10 according to the invention, comprising a wheel 12 and an adapter disc 14 which is provided for mounting on a wheel hub 16. A total of five wheel screws 18 are provided for fastening the wheel 12 to the adapter disc 14. A total of five screws 20 are provided for fastening the adapter disc 14 in the threaded bores of the wheel hub 16. A wheel hub centering ring 22 is provided for centering the adapter disc 14 relative to the wheel hub 16. A wheel centering ring 24 is provided for centering the wheel 12 relative to the adapter disc 14. A brake disc 26 is provided on the wheel hub 16, said brake disc being able to be dispensed with within the scope of the invention, or for example even being replaced by a brake drum. The brake disc 26 in the view of FIG. 1 covers the threaded bores of the wheel hub 16.

For mounting the wheel system 10 on the wheel hub 16, initially the wheel hub centering ring 22 is latched into the central opening of the adapter disc 14. The adapter disc 14 is then pushed onto the wheel hub 16. At the same time the wheel hub centering ring 22 is arranged between the outer circumference of the wheel hub 16 and the adapter disc 14 and thereby ensures an accurate centering of the adapter disc 14 relative to the wheel hub 16. The adapter disc 14 is fastened in this centered state by means of the screw 20 to the wheel hub. To this end, the screws 20 are inserted through through-openings 28 in the brake disc 26 and then screwed into threaded bores of the wheel hub 16 which are concealed in FIG. 1. After fastening the adapter disc, the wheel 12 is arranged on the adapter disc 14, wherein a wheel centering ring 24 is fastened to the wheel 12 and inserted into a central opening of the adapter disc 14 in order to center the wheel 12 relative to the adapter disc 14, and the wheel 12 is then fastened by means of the wheel screws 18 to the adapter disc 14. The adapter disc 14 is provided with a total of five threaded bushes 30 into which the wheel screws 18 may be screwed. The threaded bushes 30 have a circumferential collar 30A which protrudes beyond the surface of the adapter disc 14 which faces the wheel 12. The threaded bushes 30 engage with the collar thereof in recesses 12A of the wheel on the side of the wheel facing the adapter disc 14, wherein these recesses are not shown in FIG. 1, but see FIG. 10. The wheel may be positioned thereby in the rotational direction in a very simple manner relative to the adapter disc. The collar 30A of the threaded bushes 30 also ensures, in cooperation with the recesses 12A in the wheel 12, a reliable torque transmission between the wheel 12 and the adapter disc 14. The adapter disc 14 is connected fixedly in terms of rotation to the wheel hub 16 by the screws 20.

The wheel centering ring 24 is clipped into a central opening of the wheel 12 which is concealed in FIG. 1. The wheel centering ring 24 acts with a centering surface 34 on the inner circumference 36 of the central opening of the adapter disc 14 and ensures an accurate centering of the wheel 12 relative to the adapter disc 14. Since the adapter disc 14 is already accurately centered relative to the outer circumference of the wheel hub 16 by means of the wheel hub centering ring 22, the wheel centering ring 24 is able to ensure that the wheel 12 is accurately centered relative to the wheel hub 16. After the centering surface 34 bears against the adapter disc 14 and the wheel 12 is accurately centered relative to the adapter disc 14, the wheel screws 18 are screwed into the threaded bushes 30 in order to fasten the wheel 12 securely to the adapter disc 14 and thereby indirectly also to the wheel hub 16.

The wheel system 10 according to the invention has considerable advantages relative to conventional wheels, since by means of the adapter disc 14 and the wheel hub centering ring 22 it is possible to carry out an adaptation to different outer circumferences and pitch circles of the wheel hubs 16. Vehicles from different manufacturers and also different vehicles from one and the same manufacturer may have different wheel hubs 16. In this case, these differences relate not only to the pitch circle, i.e. the circle radius on which the threaded bores are arranged in the wheel hub 16, but also to the outer circumference of the wheel hub 16 which serves for centering the adapter disc 14 or for centering the wheels. As a result, the wheel system 10 according to the invention may be used in an exceptionally flexible manner and the wheel 12 may be fastened by means of different adapter discs 14 and different wheel hub centering rings 22 to wheel hubs 16 having a different pitch circle and a different outer circumference of a centering surface of the wheel hub 16.

Moreover, the wheel centering ring 24 also serves for an accurate centering of the wheel 12 relative to the adapter disc 14. Thus, the problem of conventional wheel systems is solved, namely that a centering of the wheel 12 relative to the adapter disc 14, and thus ultimately relative to the wheel hub 16, may not be undertaken in a sufficiently accurate manner. As may be already identified in FIG. 1, the centering surface 34 of the wheel centering ring 24 acts on the inner circumference 36 of the central bore of the adapter disc 14. As a result, space is saved and the two surfaces of the adapter disc 14 may be used entirely for arranging the threaded bushes 30 and for arranging the heads of the screws 20.

The provision of threaded bushes 30 in the adapter disc 14 makes it possible to produce the adapter disc 14 itself from a very lightweight material, for example aluminium or an aluminium alloy. The threaded bushes 30 may be manufactured from steel or another high-strength lightweight material, for example titanium, and pressed into the adapter disc 14. The screws 20 and the wheel screws 18 may also be manufactured from very lightweight and high-strength material, for example titanium. A very stable connection between the wheel 12 and the wheel hub 16 may be provided thereby, and at the same time the unsprung masses may be reduced on the wheel suspension of a vehicle.

Figure 2:
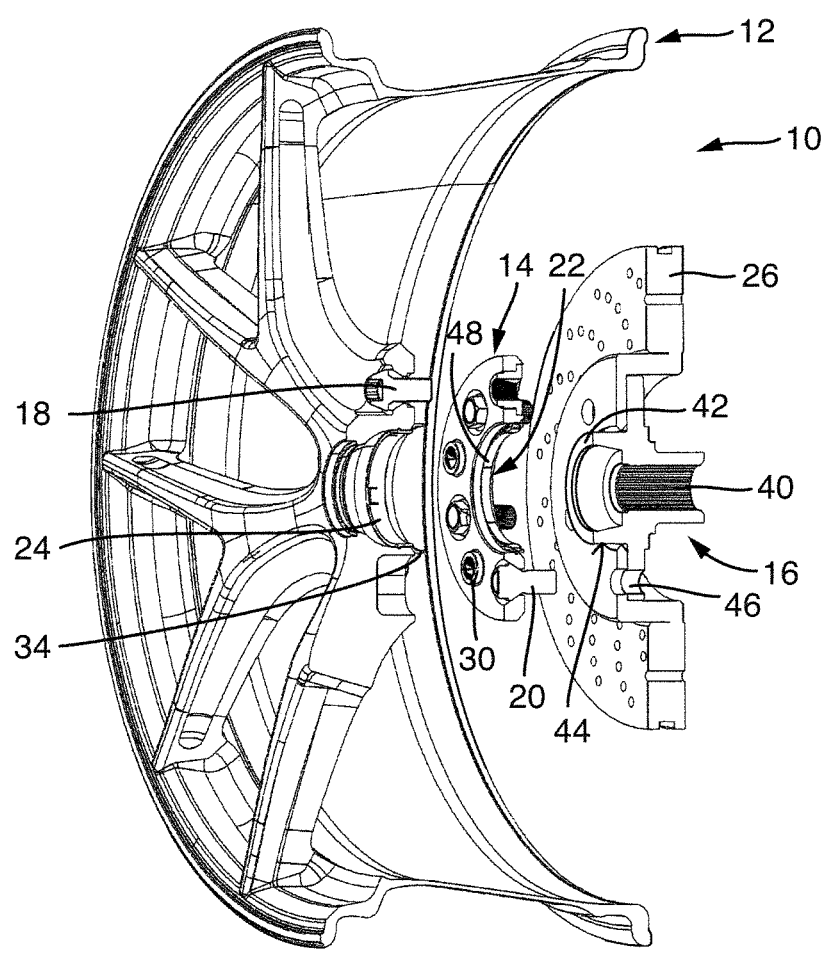
FIG. 2 shows a sectional view of the wheel system of FIG. 1 in a further exploded view.

FIG. 2 shows a sectional view of the arrangement of FIG. 1 in an exploded view and from a slightly different viewing angle. In this view, the construction of the wheel hub 16 may be identified more accurately. The wheel hub 16 has a central bore with an internal toothing 40. The internal toothing 40 may be pushed onto an external toothing of a drive shaft, not shown, for example a half shaft which originates from the differential. The internal toothing 40 may naturally also be connected to the output shaft of an electric motor. In the context of the invention, the central bore of the wheel hub and the internal toothing 14 may naturally also be dispensed with, for example when a non-driven wheel is present. The wheel hub 16 has an annular projection 42, the outer circumference 44 thereof comprising a centering surface for a conventional wheel or for an adapter disc 14 of the wheel system 10 according to the invention. In FIG. 2 one of the threaded bores 46 of the wheel hub 16 may also be identified, the screws 20 which then fasten the adapter disc 14 to the wheel hub 16 being able to be screwed therein.

Instead of the screws 20 and the threaded bores 46, the wheel hub 16 may also have screw bolts, the adapter disc 14 being pushed thereon and then being fastened by suitable nuts to the wheel hub 16.

In the context of the invention, instead of the threaded bushes 30, the adapter disc 14 in turn may also be provided with screw bolts which are then inserted through through-openings of the wheel 12, so that rather than being fastened by means of the wheel screws 18 the wheel 12 is then fastened by suitable nuts to the screw bolts of the adapter disc 14.

In FIG. 2 it is possible to identify an internal centering surface of the wheel hub centering ring 22 on the adapter disc 14. The wheel hub centering ring 22 in the view in FIG. 2 is already latched into the central opening of the adapter disc 14. The centering surface of the wheel hub centering ring 22 is configured to be slightly conical and opens in the direction of the wheel hub 16. Moreover, the centering surface is provided with a plurality of strip-like projections 48, only two thereof being able to be identified in FIG. 2. These projections 48 protrude slightly beyond the centering surface and are provided for compensating for tolerances of the outer circumference 44 of the wheel hub 16. If the outer circumference 44 is larger than the target dimension, when the wheel hub centering ring 22 is pushed on together with the adapter disc 14, the projections 48 are compressed and, if required, plastically deformed. As a result, a seat of the adapter disc 14 on the outer circumference 44 of the wheel hub 16 is achieved without clearance. If the outer circumference 44 of the wheel hub 16 is at the target dimension or possibly slightly smaller than the target dimension, only the projections 48 bear against the outer circumference 44 and thereby still ensure a centering of the adapter disc 14 relative to the wheel hub 16 without clearance.

In the view of FIG. 2 the wheel centering ring 24 is also shown in a position in which it is latched into the central bore of the wheel 12. The centering surface 34 of the wheel centering ring 24 protrudes in the direction of the adapter disc 14. When positioning the wheel 12 onto the adapter disc 14, the centering surface 34 of the wheel centering ring 24 comes into abutment with the inner circumference of the central bore of the adapter disc 14 and is able to ensure thereby an accurate centering of the wheel 12 relative to the adapter disc 14. The centering surface 34 is also provided with strip-like projections which may not be identified in FIG. 2, and which may ensure a centering of the wheel 12 relative to the adapter disc 14 without clearance, even if the central bore of the adapter disc 14 is subject to tolerances. The centering surface 34 is configured to be slightly conical and tapers in the direction of the adapter disc 14 starting from the wheel 12. As a result, the centering surface 34 of the wheel centering ring 24 may be inserted in a very simple manner into the central opening of the adapter disc 14.

Figure 3:
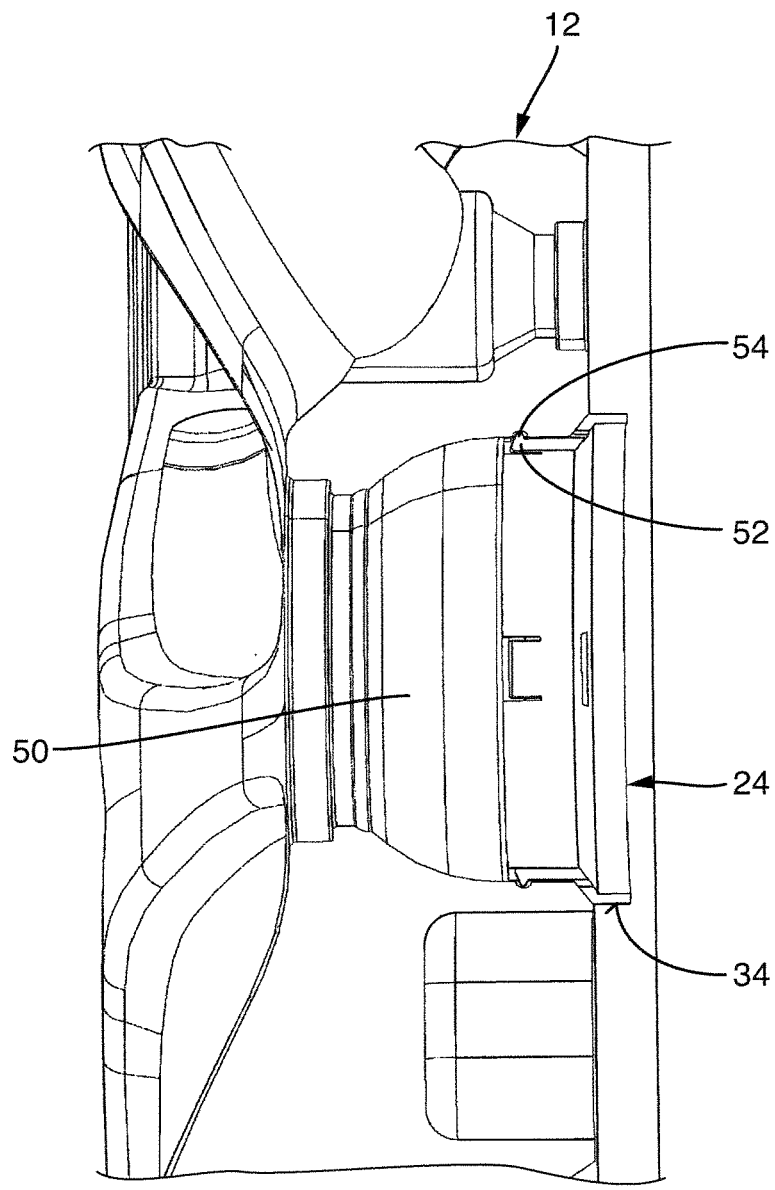
FIG. 3 shows a fragmentary sectional view of the wheel of the wheel system of FIG. 1.

The view in FIG. 3 shows a sectional view of the wheel 12 with the wheel centering ring 24, which is enlarged in some portions. It is possible to identify the external centering surface 34 of the wheel centering ring 24. The conical configuration of the centering surface 34 may not be seen in FIG. 3, since it is configured to be very slight and the centering surface 34, when viewed away from the wheel 12, tapers by only a few tenths of a millimetre, for example $\frac{1}{10}$ mm to $\frac{2}{10}$ mm. In the context of the invention, the centering surface 34 does not necessarily have to be configured to be conical.

The wheel centering ring 24 has on its end inserted into the central opening 50 of the wheel 12 a circumferential collar with a total of four latching lugs 52, in FIG. 3 only three thereof being able to be seen. These latching lugs 52 snap into a circumferential groove 54 in the central opening 50 of the wheel 12 and thereby secure the wheel centering ring 24 in the central opening 50 without clearance.

The wheel centering ring 24 is advantageously produced from plastics. In this case, fibre-reinforced plastics may be selected. Advantageously, the wheel centering ring is produced as a plastics injection-moulded part.

The wheel hub centering ring 22 is also advantageously produced as a plastics part, in particular a plastics injection-moulded part.

Figure 4:
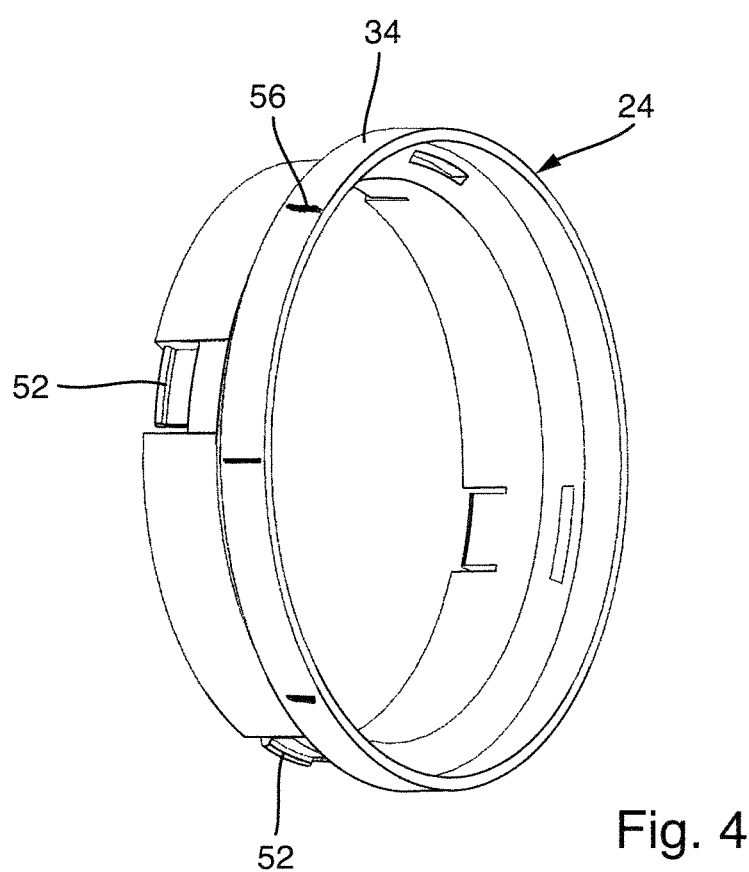
FIG. 4 shows the wheel centering ring of the wheel system of FIG. 1.

FIG. 4 shows the wheel centering ring 24 in a view obliquely from the front. It is possible to identify the circumferential centering surface 34 which is provided with a plurality of strip-like projections 56 running in the axial direction. The strip-like projections 56, as described above, serve to center the wheel 12 relative to the adapter disc 14 without clearance. If the central opening of the adapter disc 14 has a smaller diameter than the target diameter, the strip-like projections 56 are compressed and, if required, plastically deformed. If the central opening of the adapter disc 14 has its target diameter or even a diameter which is slightly larger than the target diameter, the projections 56 bear against the inner circumference of the central opening and ensure thereby a centering of the wheel 12 relative to the adapter disc 14 without clearance.

The latching lugs 52 of the wheel centering ring 24 which are arranged on resilient latching arms are also able to be clearly identified in FIG. 4. The wheel centering ring 24 is designed in one piece and when inserted into the central opening 50 of the wheel 12, see FIG. 3, the latching lugs 52 are initially deflected radially inwardly until they have reached the level of the circumferential groove 54 in the central opening 50 of the wheel 12. Then the latching lugs 52 snap outwardly and engage in the circumferential groove 54. The wheel centering ring 24 is then secured thereby to the wheel 12.

Figure 5:
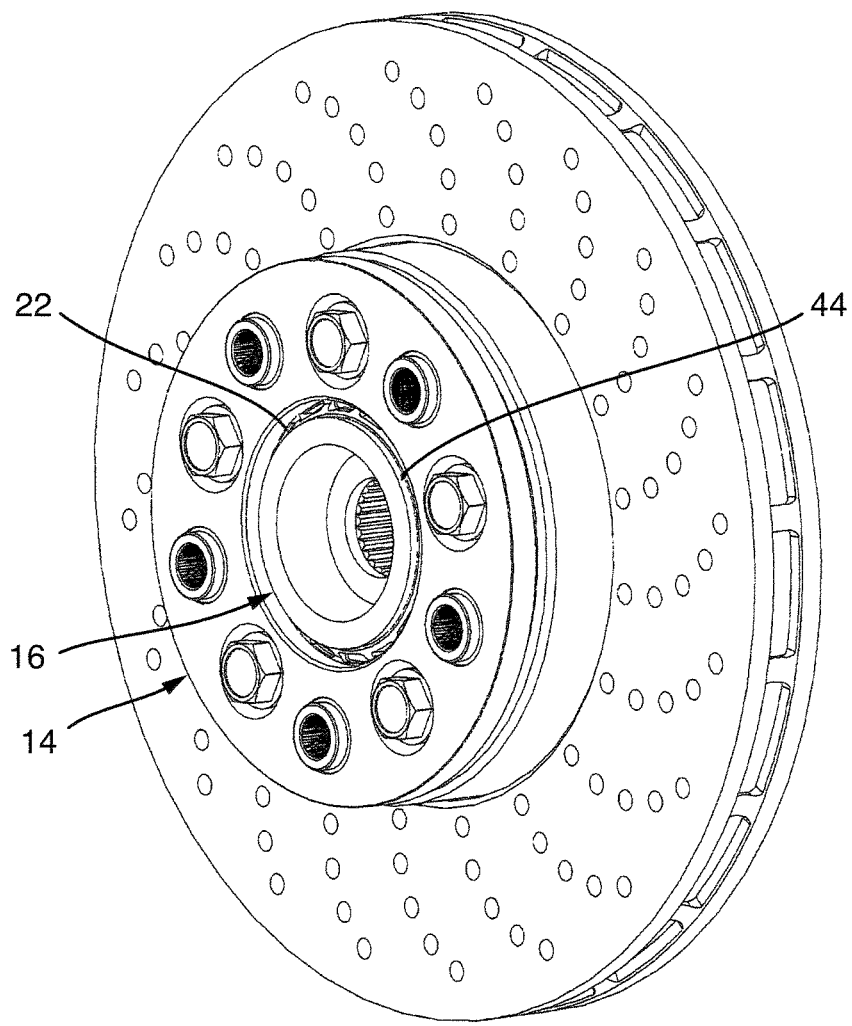
FIG. 5 shows the adapter disc of the wheel system of FIG. 1 mounted on a wheel hub.

FIG. 5 shows an enlarged view of the wheel hub 16 with the adapter disc 14 fastened thereto. In this view it may be identified how the wheel hub centering ring 22 is arranged between the inner circumference of the central opening of the adapter disc 14 and the outer circumference 44 of the wheel hub 16, and thereby ensures a centering of the adapter disc 14 relative to the wheel hub 16 without clearance.

Figure 6:
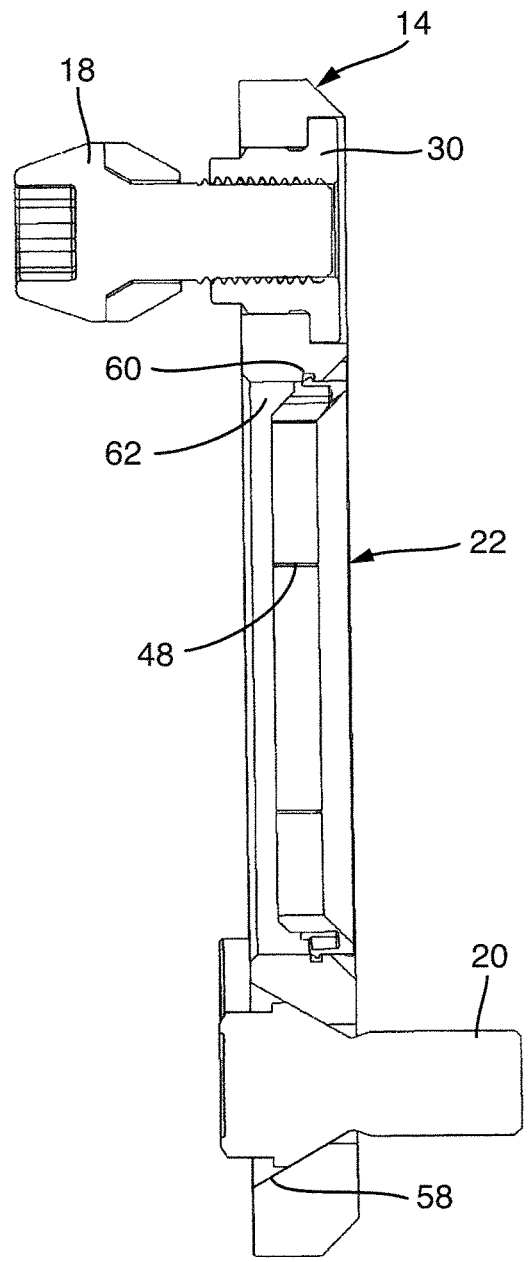
FIG. 6 shows a sectional view of the adapter disc of the wheel system of FIG. 1.

FIG. 6 shows a sectional view of the adapter disc 14. Threaded bushes 30 are pressed into suitably configured through-openings of the adapter disc 14, the wheel screws 18 being able to be screwed into said threaded bushes. The threaded bushes 30 are pressed fixedly in terms of rotation into the adapter disc 14.

The adapter disc 14 has through-openings 58 for inserting the screws 20. The through-openings have a conical bearing portion and a cylindrical through-portion. The screws 20 have a conical bearing collar which is located in the conical portion of the through-openings 58.

The wheel hub centering ring 22 is inserted into the central opening of the adapter disc 14 and latched by means of a plurality of latching lugs in a circumferential groove 60 in the central opening of the adapter disc 14. The centering surface of the wheel hub centering ring 22 is located inside the central opening of the adapter disc 14. As a result, an exceptionally space-saving arrangement is achieved. In FIG. 6 it is possible to identify the projections 48 on the centering surface of the wheel hub centering ring 22.

It may be seen in FIG. 6 that the wheel hub centering ring 22 firstly does not protrude beyond the surface of the adapter disc 14, which is arranged to the right in FIG. 6, and secondly protrudes therein only up to slightly more than half of the axial length of the central opening of the adapter disc 14. Starting from the surface of the adapter disc 14, which is shown to the left in FIG. 6 and which faces the wheel in the mounted state, a portion of the inner circumference of the central opening of the adapter disc 14 is still free and free space 62 is still present radially inside the inner circumference of the central opening, into which the wheel centering ring 24 may then be inserted in some portions. Specifically, the centering surface 34 of the wheel centering ring 24 is inserted into this free space 62 and then bears against the inner circumference of the central opening of the adapter disc 14. In the axial direction an exceptionally space-saving arrangement is achieved thereby.

Figure 7:
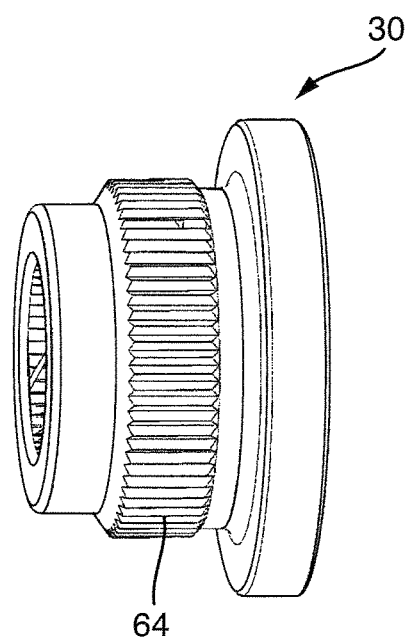
FIG. 7 shows a threaded bush of the adapter disc of the wheel system of FIG. 1.

FIG. 7 shows the threaded bushes 30 which are pressed into the adapter disc 14, see FIG. 6. The threaded bush 30 has a circumferential toothing 64, wherein the individual teeth of the toothing 64 run in the axial direction. The threaded bush 30 may be pressed thereby in the axial direction into a suitable through-opening of the adapter disc 14. The threaded bush 30 then sits fixedly in terms of rotation in the adapter disc 14. The threaded bush 30 may be produced from steel, but for example also from titanium, in order to be configured to be high-strength, on the one hand, and to be very lightweight, on the other hand.

Figure 8:
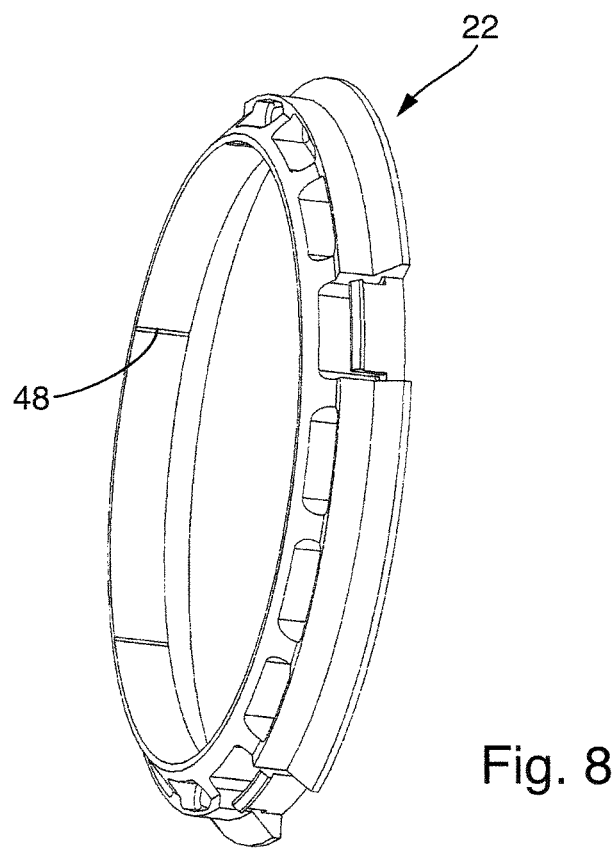
FIG. 8 shows a wheel hub centering ring of the wheel system of FIG. 1.

FIG. 8 shows the wheel hub centering ring 22 obliquely from the front. It is possible to identify the latching lugs on the wheel hub centering ring 22 and a plurality of projections 48 on the centering surface of the wheel hub centering ring 22 which is then pushed onto the outer circumference 44 of the wheel hub 16.

Figure 9:
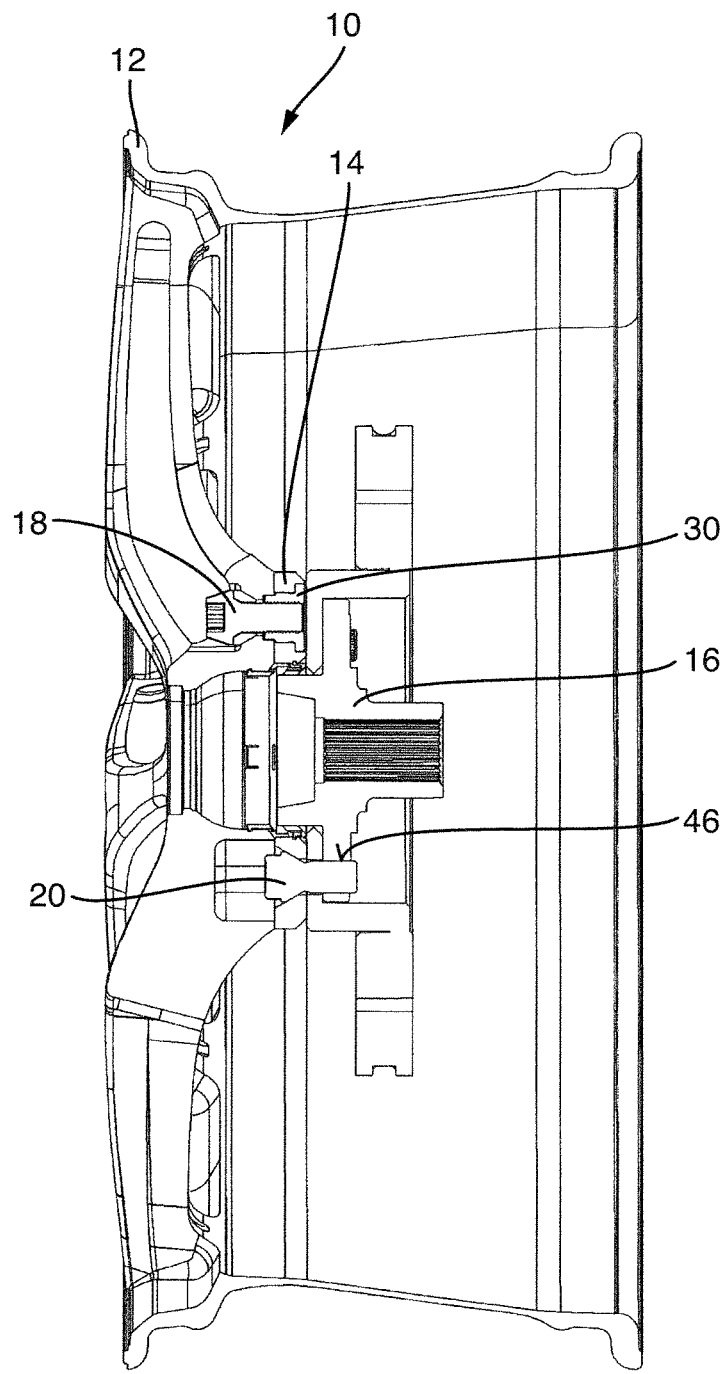
FIG. 9 shows a sectional view of an arrangement comprising the wheel system of FIG. 1 in the mounted state.

FIG. 9 shows a sectional view of an arrangement with the wheel system 10 according to the invention of FIG. 1 and the wheel hub 16. The cutting plane, on the one hand, passes through one of the wheel screws 18 by which the wheel 12 is fastened to the adapter disc 14. The cutting plane also runs through one of the screws 20 which engage in threaded bores 46 of the wheel hub 16 for fastening the adapter disc 14.

In FIG. 9 it may also be seen how the collar of the threaded bush 30, which protrudes beyond the surface of the adapter disc 14 facing the wheel 12, engages in a suitable recess in the wheel 12. As a result, the wheel 12 firstly may be accurately prepositioned when positioned on the adapter disc 14, so that the wheel screws 18 may be easily screwed in. Moreover, via this protruding collar, torque may also be transmitted from the wheel 12 to the adapter disc 14 and ultimately to the wheel hub 16 or vice-versa. With very high-torque vehicles this engagement of the collar of the threaded bush 30 into a suitable recess of the wheel 12 ensures a secure and torque-resistant fastening of the wheel 12 to the adapter disc 14 and thereby the wheel hub 16.

Figure 10:
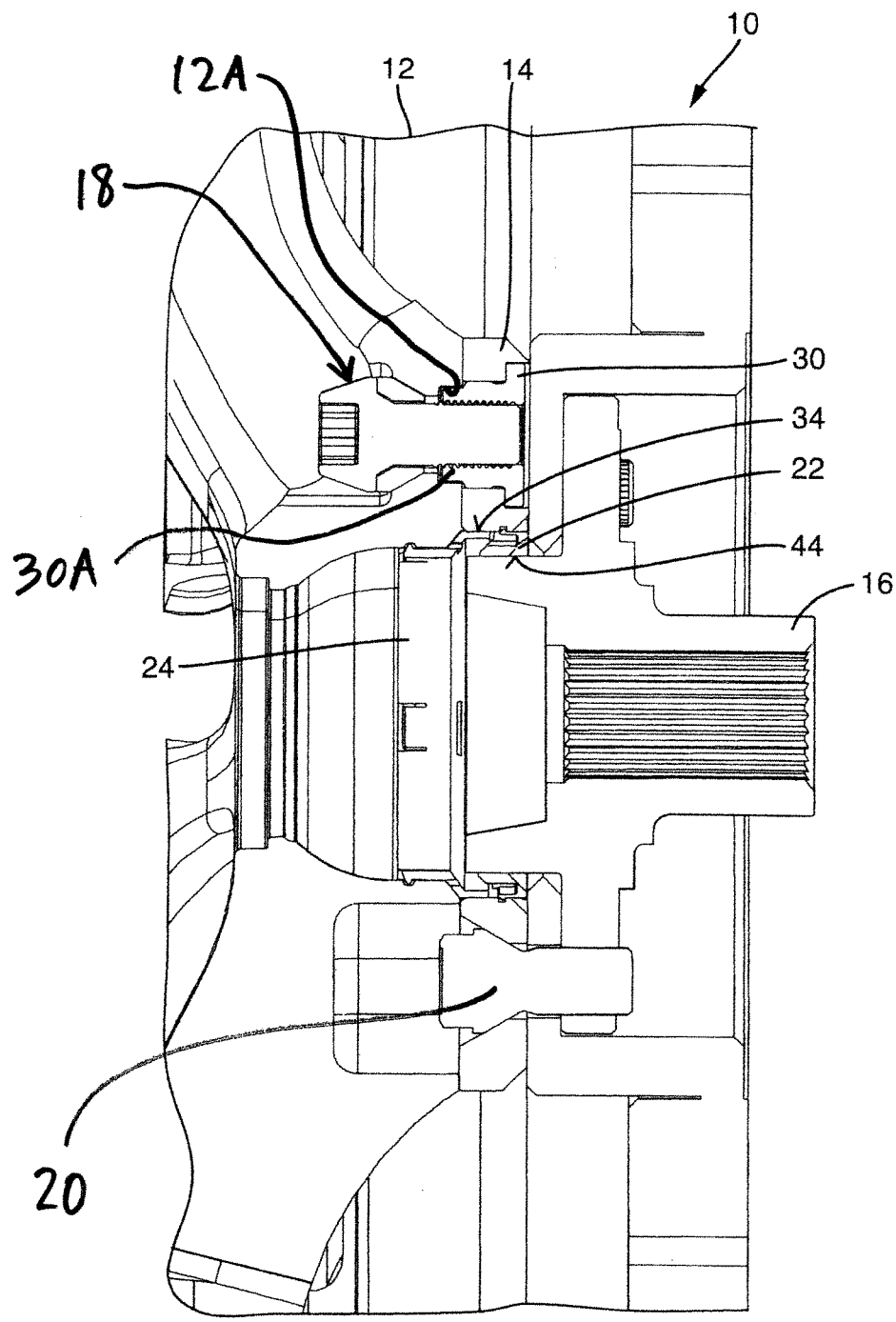
FIG. 10 shows a fragmentary enlargement of the sectional view of FIG. 9.

FIG. 10 shows an enlarged detail of the view of FIG. 9. In this view it may be clearly seen that the centering surface 34 of the wheel centering ring 24 bears without clearance against the inner circumference of the central opening of the adapter disc 14 and thereby ensures an accurate centering of the wheel 12 relative to the adapter disc 14 without clearance.

It may be further seen in FIG. 10 that the wheel hub centering ring 22 ensures a centering of the adapter disc 14 relative to the outer circumference 44 of the wheel hub 16 without clearance. By means of the wheel system 10 according to the invention, the wheel 12 is thus centered relative to the wheel hub 16 without clearance.

It may be further identified in FIG. 10 how the circumferential collar of the threaded bush 30 engages in the suitable recess of the wheel 12.

Figure 11:
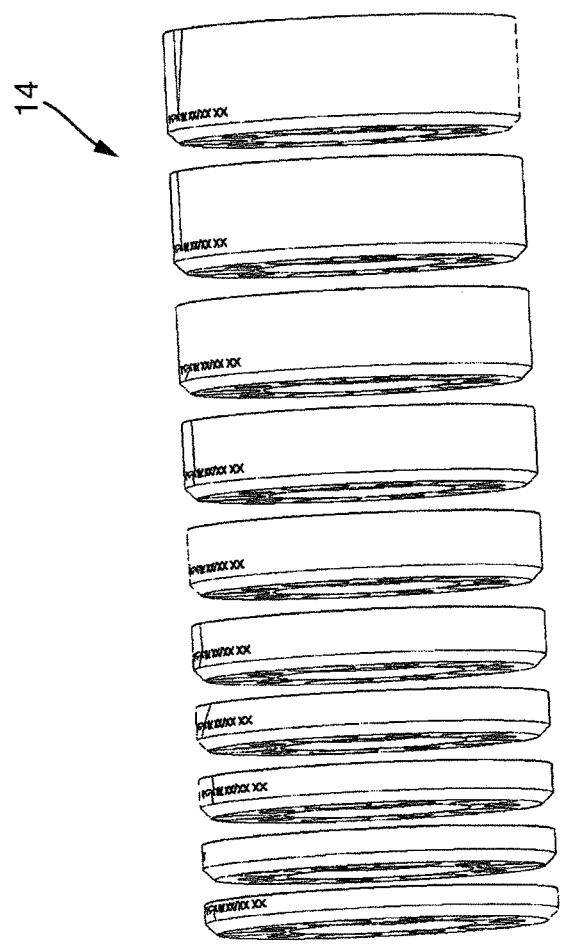
FIG. 11 shows a plurality of different adapter discs of the wheel system according to the invention.

FIG. 11 shows a set comprising a plurality of adapter discs 14 of the wheel system according to the invention. The different adapter discs 14 have different thicknesses and are able to implement thereby different wheel offsets or different track widths when the wheel 12 is mounted with different adapter discs 14 on the wheel hub 16.

Moreover, the adapter discs 14 may have different pitch circles of the through-openings 58, the screws 20 being inserted therethrough in order to connect the adapter disc 14 to the wheel hub 16. The through-openings 58 may also be configured as slots, in particular curved slots, if required.

Figure 12:
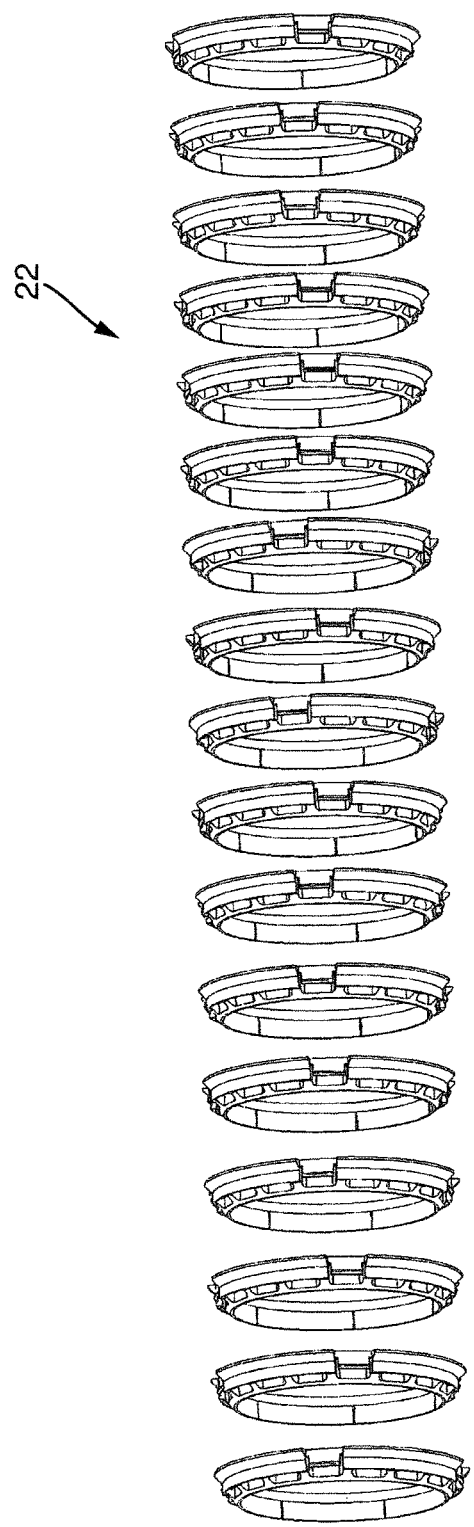
FIG. 12 shows a plurality of different wheel hub centering rings of the wheel system according to the invention.

FIG. 12 shows a set of different wheel hub centering rings 22 of the wheel system according to the invention. The wheel centering rings 22 have in each case a different inner circumference of the centering surfaces thereof, in order to be mounted on differently configured wheel hubs 16. By means of the different wheel hub centering rings 22 of the set shown in FIG. 12, therefore, the adapter disc 14 may be adapted to very different wheel hub external diameters.

The invention claimed is:

1. A wheel system comprising:
    a wheel having at least one recess;
    an adapter disc for mounting on a wheel hub of a vehicle, the adapter disc having a surface facing the wheel and at least one projection projecting outwardly from the surface in a direction towards the wheel, the at least one projection forming part of the adapter disc and being engaged in the at least one recess of the wheel;
    a plurality of wheel screws or a plurality of wheel nuts fastening the wheel to the adapter disc;
    a plurality of screws or a plurality of nuts for fastening the adapter disc to the wheel hub;
    a wheel hub centering ring for centering the adapter disc relative to the wheel hub; and
    a wheel centering ring for centering the wheel relative to the adapter disc.

2. The wheel system according to claim 1, wherein the wheel centering ring comprises plastics.

3. The wheel system according to claim 1, wherein the wheel centering ring has a centering surface including a plurality of nubs or projections.

4. The wheel system according to claim 1, wherein the wheel centering ring includes a conical centering surface.

5. The wheel system according to claim 1, further including latching means fastening the wheel centering ring to the wheel.

6. The wheel system according to claim 1, wherein the wheel centering ring has at least two latching lugs and the wheel has a central opening and a circumferential groove in the central opening, at least two latching lugs latching into the circumferential groove.

7. The wheel system according to claim 1, wherein the adapter disc has a central opening with an inner circumference and the wheel centering ring includes a centering surface engaged with the inner circumference of the central opening of the adapter disc.

8. The wheel system according to claim 1, wherein the adapter disc has a plurality of threaded bushes and each of the wheel screws are threadingly engaged within one of the threaded bushes, or the adapter disc has a plurality of screw bolt inserts, each of the screw bolt inserts threadingly engaging one of the wheel nuts.

9. The wheel system according to claim 8, wherein the at least one projection of the adapter disc comprises a plurality of projections and the at least one recess of the wheel comprises a plurality of recesses, each of the threaded bushes having a collar protruding beyond the surface of the adapter disc facing the wheel, and each collar forms one of the plurality of projections and engages in one of the plurality of recesses.

10. The wheel system according to claim 1, wherein the wheel hub has an outer circumference, and the wheel hub centering ring has a centering surface engaged with the outer circumference of the wheel hub.

11. The wheel system according to claim 10, wherein the centering surface of the wheel hub centering ring has a plurality of nubs or projections.

12. The wheel system according to claim 10, wherein the centering surface of the wheel hub centering ring is conical.

13. The wheel system according to claim 1, wherein the wheel hub centering ring has latching means for fastening the wheel hub centering ring to the adapter disc.

14. The wheel system according to claim 1, further comprising a set comprising a plurality of adapter discs, wherein the adapter discs of the set have different thicknesses and/or different pitch circles for connecting to the wheel hub.

15. The wheel system according to claim 1, further comprising a set comprising a plurality of wheel hub centering rings, and centering surfaces of the wheel hub centering rings of the set have different diameters.

16. An arrangement comprising:
a vehicle wheel hub; and
a wheel system, the wheel system comprising:
  a wheel having at least one recess;
  an adapter disc for mounting on the vehicle wheel hub, the adapter disc having a surface facing the wheel and at least one projection projecting outwardly from the surface in a direction towards the wheel, the at least one projection forming part of the adapter disc and being engaged in the at least one recess of the wheel;
  a plurality of screws or a plurality of nuts for fastening the adapter disc to the wheel hub;
  a wheel hub centering ring for centering the adapter disc relative to the vehicle wheel hub;
  a plurality of wheel screws or a plurality of wheel nuts fastening the wheel to the adapter disc; and
  a wheel centering ring for centering the wheel relative to the adapter disc.

17. The wheel system according to claim 1, wherein the adapter disc comprises a component including the at least one projection thereon, and one of the wheel screws or one of the wheel nuts is threadingly engaged with the component to fasten the wheel to the adapter disc.

18. A wheel system for a vehicle having a wheel hub, the wheel system comprising:
  a wheel defining a central axis, the wheel including oppositely-facing first and second sides and at least one recess opening outwardly through the first side;
  an adapter disc for mounting on the wheel hub of the vehicle, the adapter disc having a surface disposed in facing relation with the first side of the wheel and at least one projection projecting outwardly from the surface in an axial direction towards the wheel and forming part of the adapter disc, the at least one projection being engaged within the at least one recess to rotationally position the wheel relative to the adapter disc during assembly and to permit torque transmission between the wheel and the adapter disc;
  a plurality of wheel screws or a plurality of wheel nuts fastening the wheel to the adapter disc;
  a plurality of screws or a plurality of nuts for fastening the adapter disc to the wheel hub;
  a wheel hub centering ring disposed to center the adapter disc relative to the wheel hub; and
  a wheel centering ring disposed to center the wheel relative to the adapter disc.

19. The wheel system according to claim 18, wherein the adapter disc comprises a component including the at least one projection thereon, and one of the wheel screws or one of the wheel nuts is threadingly engaged with the component to fasten the wheel to the adapter disc.

20. The wheel system according to claim 19, wherein:
the component comprises at least one bushing fixed to the adapter disc and defining an opening therein and one of the wheel screws is threadingly engaged within the opening of the bushing to fasten the wheel to the adapter disc; or
one of the wheel nuts is threadingly engaged with the component to fasten the wheel to the adapter disc.

* * * * *